US006204990B1

(12) United States Patent
Bruccoleri et al.

(10) Patent No.: US 6,204,990 B1
(45) Date of Patent: Mar. 20, 2001

(54) CIRCUIT AND METHOD FOR DETERMINING THE POSITION OF A READ HEAD FOR A MAGNETIC DISK DRIVE DEVICE

(75) Inventors: Melchiorre Bruccoleri, Genoa; Marco DeMicheli, Binago-Como; Davide DeMicheli, Pavia; Giuseppe Patti, Favara-Agrigento, all of (IT)

(73) Assignee: SGS-Thompson Microelectronics S.r.l., Milan (IT)

( * ) Notice: Subject to any disclaimer, the term of this patent is extended or adjusted under 35 U.S.C. 154(b) by 0 days.

(21) Appl. No.: 09/412,080

(22) Filed: Oct. 4, 1999

Related U.S. Application Data

(62) Division of application No. 08/904,599, filed on Aug. 1, 1997, now Pat. No. 6,002,542.

(30) Foreign Application Priority Data

Aug. 7, 1996 (EP) .................................................. 96830448

(51) Int. Cl.⁷ ..................................................... G11B 5/596
(52) U.S. Cl. ..................................... 360/77.11; 360/77.02
(58) Field of Search ................................... 360/29, 77.01, 360/77.04, 77.05, 77.07, 77.08, 77.11, 77.02; 318/560

(56) References Cited

U.S. PATENT DOCUMENTS

| | | | | |
|---|---|---|---|---|
| 4,380,034 | * | 4/1983 | Krake | 360/77.04 X |
| 4,833,551 | * | 5/1989 | Song | 360/77.05 |
| 5,400,201 | * | 3/1995 | Pederson | 360/77.08 |
| 5,483,393 | * | 1/1996 | Mento et al. | 360/77.08 |
| 5,483,394 | * | 1/1996 | Harman | 360/77.12 |
| 5,583,706 | * | 12/1996 | Dudley et al. | 360/51 X |
| 5,801,895 | * | 9/1998 | Abramovich | 360/77.08 |
| 5,825,318 | * | 10/1998 | Patapoutian et al. | 341/131 |

* cited by examiner

*Primary Examiner*—Andrew L. Sniezek
(74) *Attorney, Agent, or Firm*—Jenkens & Gilchrist, P.C.; Theodore E. Galanthay

(57) ABSTRACT

A servo-demodulator for a pair of alternating signals generated by a magnetic disc read head and indicative of the position of the read head in relation to the center of a recorded track. The servo-demodulator comprises a peak detector for successively and individually sampling the amplitude of each of a plurality of peaks of the pair of alternating signals, and a capacitor periodically connected to the output of the peak detector by a control logic for deriving a weighted average of the various successively sampled amplitudes. In this manner, the control logic obtains an averaged measure of amplitude with high immunity to noise.

18 Claims, 4 Drawing Sheets

CIRCUIT AND METHOD FOR DETERMINING THE POSITION OF A READ HEAD FOR A MAGNETIC DISK DRIVE DEVICE

This application is a divisional of application Ser. No. 08/904,599, filed Aug. 1, 1997 and now U.S. Pat. No. 6,002,542.

FIELD OF THE INVENTION

The present invention relates to a precision servo-demodulator for providing the actuator which positions a read head of a rigid magnetic disc with the data necessary to maintain the correct alignment of the read/write head over the center of a track.

BACKGROUND OF THE INVENTION

It is known that magnetic discs are recorded with concentric circular tracks each divided into sectors, with each sector being provided with a read/write field called a header containing information defining which of the various tracks the sector belongs to and which sector among the various track sectors, and other information. In order to be able to obtain a high track density, and therefore a high disc capacity, and to ensure that data is correctly written to and read from a track, it is necessary to control the position of the head on the track and correcting it if the head is not exactly aligned on the track center.

To this end, in the header field of each sector two short successions of sinusoidal signals, called "servo bursts" of equal amplitude are recorded, one on either side of the track center, over separate arcs of the header field. If, during the course of a subsequent reading, the read head is correctly positioned over the track center, the previously effected recording induces two identical signals in the read head when the two separate arcs of the header field are read. Otherwise, the two signals differ in amplitude and provide an indication of the displacement of the head from the center of the track. This indication is utilized by a control system to correct the position of the head, aligning it on the center of the track.

The known techniques for measuring the displacement of the head from the track center to compare between the two signals read from the servo recording are essentially of two types:

1) Peak detection: the peak, that is, the maximum value of the signals provided by the head upon reading each of the two servo bursts, is memorized and compared with the other. This recognition method has the advantage of requiring relatively simple sampling and memory circuits and of being independent of the timing signals which activate the sampling operation (which must be activated only for reading the two servo bursts, and not when the other data is read). A serious disadvantage of this method is the low immunity to noise and therefore low precision. In fact, a disturbance which causes an increase, even of a single signal peak, contributes its amplitude integrally to the detection of an erroneous amplitude value of the peak. It is to be noted that in the case of signals provided by a read head (generally through a preamplifier) with asymmetrical characteristics, as is the case when the read head is of magnetoresistive type, two identical sampling circuits are necessary, respectively, for the recognition of the maximum positive peak and the maximum negative peak, which is converted into a positive peak with a simple inversion of the connection of the input terminals. The sum of the two measurements provides the peak-to-peak amplitude of the signal.

2) Area detection: This technique is based on the measurement of the area of the rectified signal. Although conceptually very simple, this technique, which involves an integration of the signal over a predetermined time interval, requires complex and expensive circuits. Moreover, the measurement precision depends on the precision with which the integration time interval is defined. The advantage of this technique, which has a high immunity to noise, is that it does not require circuit duplication in the case of asymmetric signals, but this only partly compensates for the above-mentioned disadvantages.

What is desired is a technique which is constructionally simple with a high immunity to noise without being influenced by imprecisions in the timing signal.

SUMMARY OF THE INVENTION

Accordingly, the present invention provides a servo-demodulator which, while being constructionally simple, has a high immunity to noise without being influenced by imprecisions in the timing signal.

The present invention provides a servo-demodulator for a pair of successive alternating variable signals, generated by a magnetic disc read head and indicative of the position of the read head on a recorded track on the disc, the signals of the pair having a plurality of positive peaks and a plurality of negative peaks. The servo-demodulator comprises a pair of input terminals for receiving the alternating variable signals and a detector for detecting the positive peaks of the signals of the pair. The detector is connected to the pair of input terminals and includes a first sample and hold capacitor and a first normally open reset switch closed by a reset pulse. The servo-demodulator also includes a means connected to the pair of input terminals for generating a first signal, the assertion of which defines a periodic time window for sampling each of the positive peaks and a second signal, the assertion of which defines a second periodic time window separate from the sampling window, containing one of the negative peaks. The servo-demodulator further comprises a second sample and hold capacitor and a second normally open switch for connecting the second capacitor in parallel with the first capacitor when closed by an averaging command signal. The servo-demodulator further comprises logic control means connected to the means for generating the first and second signal for receiving the first signal, the logic control means being activated by an asserted external signal indicative of the generation by the head of one of the pair of alternate variable signals, to produce the reset pulse at its output upon assertion of the first signal and the averaging command signal coasserted with a first assertion of the first signal and with the assertions of the second signal subsequent to two preceding assertions of the first signal.

The present invention also provides a servo-demodulator for a pair of asymmetrical successive alternating variable signals generated by a read head of a magnetic disc and indicative of the position of the read head on a magnetic record track, the signals of the pair having a plurality of positive peaks and a plurality of negative peaks. The servo-demodulator comprises a first servo-demodulator, a second servo-demodulator wherein the variable signals are applied through the pair of input terminals with a signal inversion relative to the application of the signals to the input terminals of the first servo-demodulator, and a third, normally open, switch closed by a control pulse for averaging the averages, for connecting the second capacitor of the first and second servo-demodulators respectively in parallel with one another. The servo-demodulator further comprises a means for generating the command pulse when the external signal is deasserted.

The servo-demodulator comprises a signal peak detector and other circuits which together detect the amplitude of each of the different signal peaks and takes a weighted average.

BRIEF DESCRIPTION OF THE DRAWINGS

The characteristics and advantages of the invention will become more clearly apparent from the following description, by way of non-limitative example, with reference to the attached drawings, in which.

DETAILED DESCRIPTION OF A PREFERRED EMBODIMENT OF THE INVENTION

Figure 1:
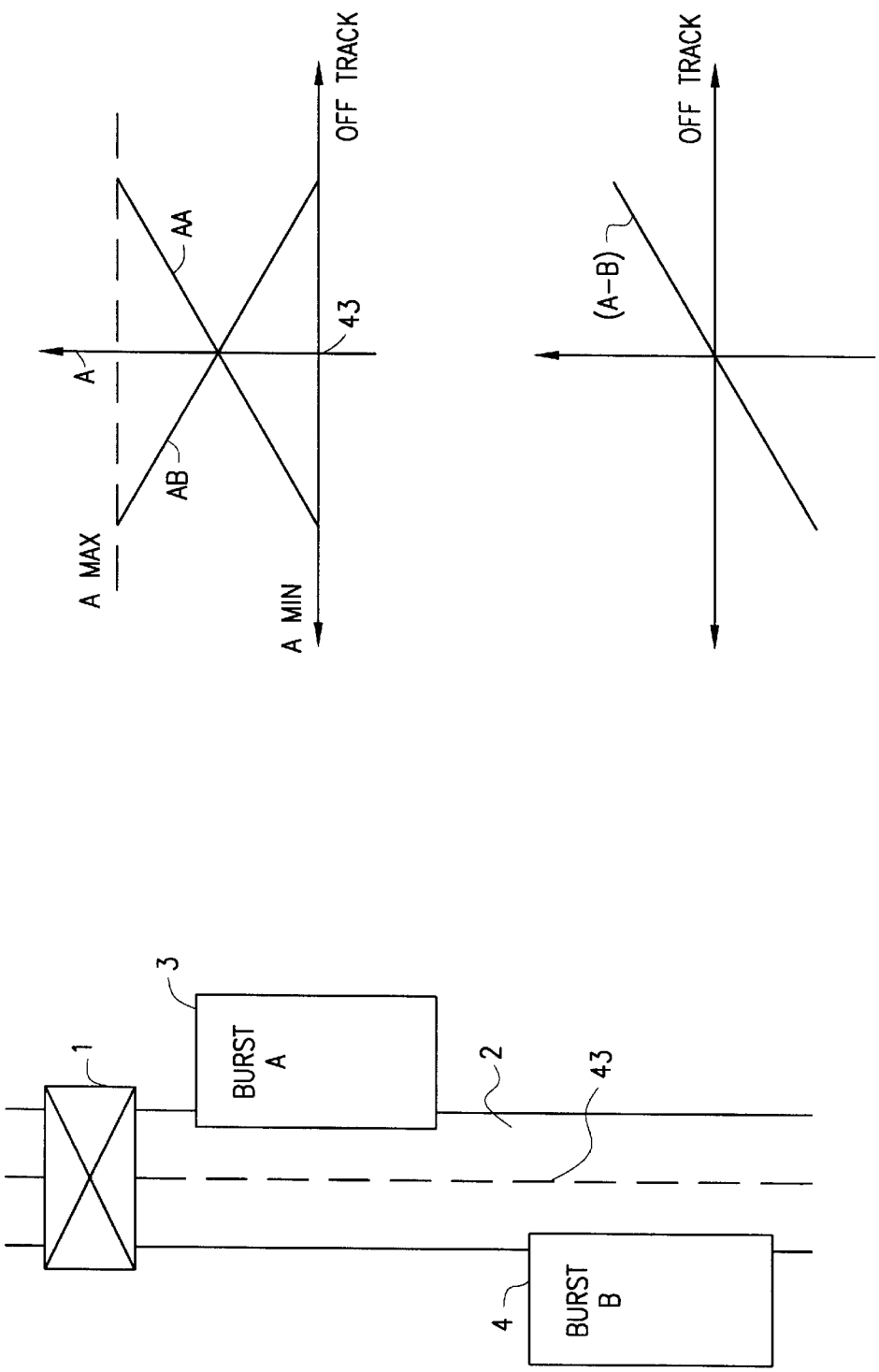
FIG. 1 is a schematic view of the relative arrangement of a read head on a read/write track portion of a magnetic disc, showing the "servo bursts" which are read by the head and utilized to identify the position of the head in relation to the track center.

Referring now to FIG. 1, a schematic view showing the relative disposition of a read head 1 on a read/write track 2 of a magnetic disc is illustrated.

For repetitive and reliable reading and writing of data, it is necessary that the read head be aligned on the track center 43. To identify the position of the read head on track 2, two short sequences of sinusoidal signals or "servo bursts" 3, 4 are pre-recorded on the disc, in the various header blocks of the track sectors, over separate arcs, respectively on one side and the other of the track center 43 at equal distances therefrom.

The recording of the two servo bursts 3, 4 involves the formation on the disc of two series of magnetic dipoles which for simplicity are also called BURST A and BURST B.

When, during its movement relative to the magnetic support, the read head 1 passes first over servo burst 3 and then over servo burst 4, two successive alternating variable electrical signals of sinusoidal form are induced in the head if the head is of inductive type, and being of only approximately sinusoidal form and asymmetrical if the head is of magnetoresistive type. The amplitude of the two signals depends on the position of the head with respect to track center 43.

Figure 2:
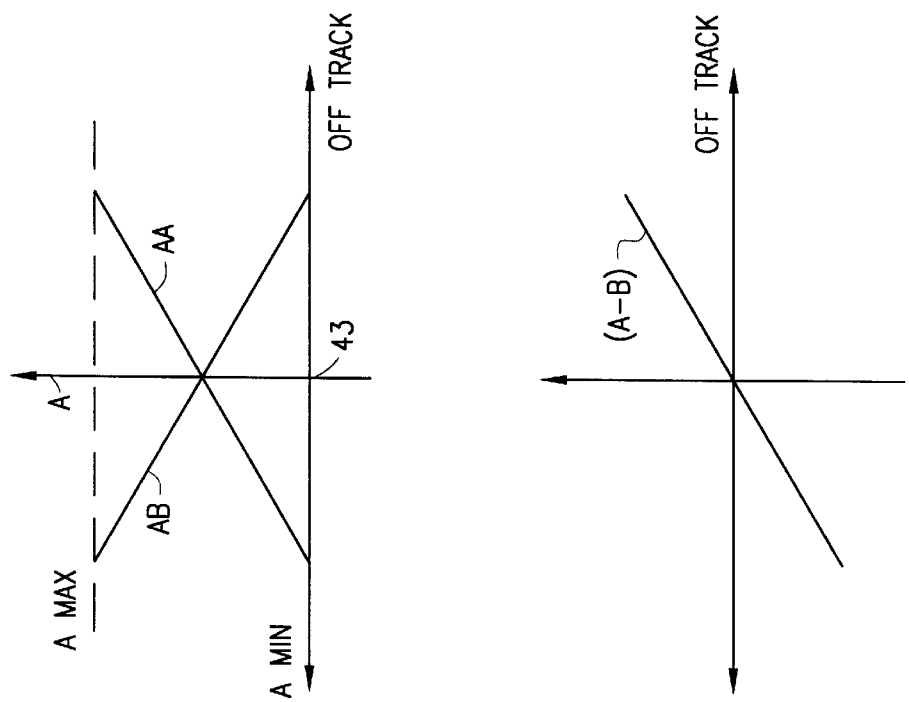
FIG. 2 is a Cartesian diagram schematically representing the amplitude of the pair of signals resulting from reading two "servo bursts" as a function of the offset of the head from the track center and the difference between the two signals.

Referring now to FIG. 2, the relationship of the amplitude of the signals resulting from reading two "servo bursts" to the offset (off-track) of head 1 to track center 43 will be described. It is evident that if read head 1 is centered on BURST A and therefore offset to the right with reference to FIG. 1, the amplitude of the read signal AA of BURST A is a maximum while the amplitude of signal AB read from BURST B is a minimum, practically nil. Correspondingly, if head 1 is centered on BURST B, the amplitude of the signal AA read from BURST A is a minimum while the amplitude of the signal AB read from BURST B is a maximum.

If the amplitude of the two signals, which are successive in time, is sampled, the difference between the two sampled amplitudes represented by diagram A-B of FIG. 2, provides an unequivocal indication of the offset of the head from track center 43 and can be used, preferably converted into a digital signal either before or after the subtraction operation, to control a servo actuator which correctly repositions head 1 on track center 43.

Figure 3:
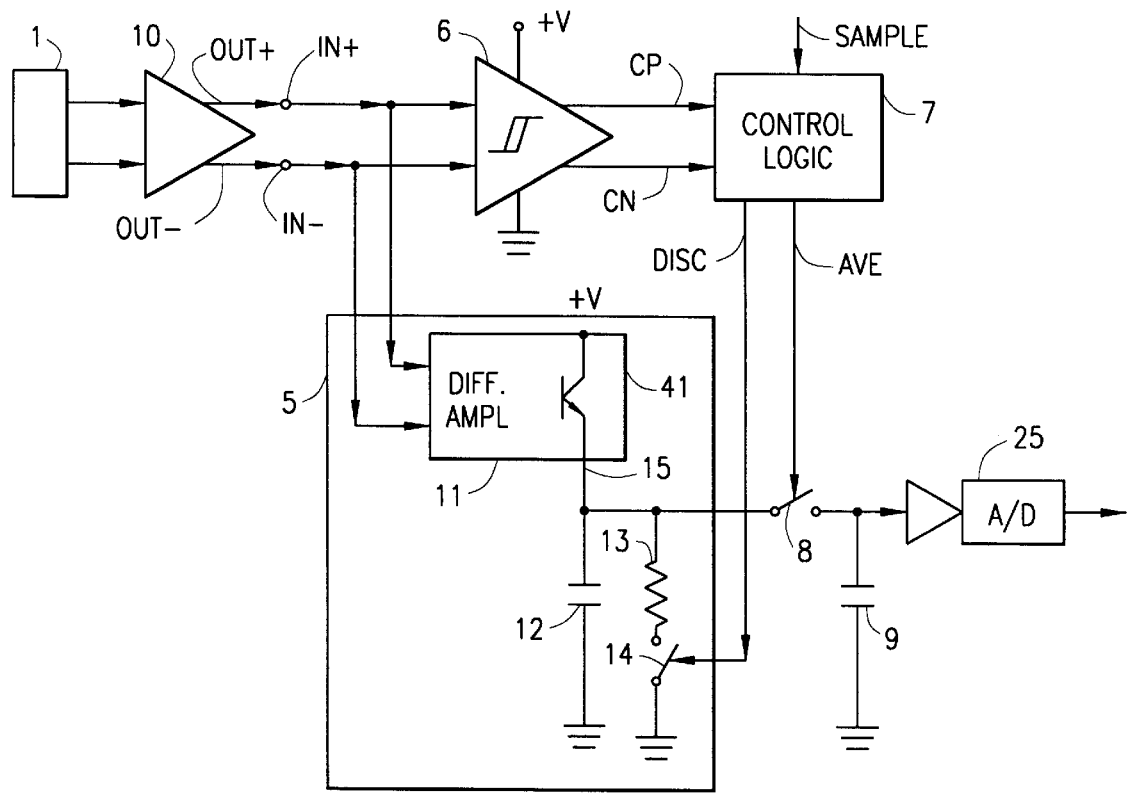
FIG. 3 is a partial block circuit diagram of a preferred embodiment of servo-demodulator in accordance with the present invention.

Referring now to FIG. 3, a partial block circuit diagram of a preferred embodiment of a servo-demodulator in accordance with the invention, which measures the amplitude of the two signals with multiple peak sampling and weighted average of the samples, consequently obtaining a high immunity to noise and high measurement precision, will be illustrated.

The servo-demodulator comprises a peak detector 5, a differential comparator 6 with hysteresis, control logic 7, an electronic switch 8 and a capacitor 9. The servo-demodulator, supplied by a positive voltage +V (for example 5V normally used in data processing systems but which could be 3.6 or 3.3 V according to current trends) has two inputs IN+, IN−, to receive the signal generated by a read head 1, conveniently preamplified by a preamplifier 10 and available between two outputs OUT+, OUT−. Typically the output signal from the preamplifier 10 resulting from reading the servo bursts is a short sequence of sinusoidal waves with positive peaks alternating with negative peaks, of relatively high frequency of the order of 10–30 MHZ and peak-to-peak amplitude of the order of 10/400 mV. The distinction between positive and negative peaks is purely conventional and depends on which of the terminals OUT+ and OUT− is considered as the reference.

In the case of read heads of inductive type, the read signal is symmetrical and perfectly sinusoidal. On the other hand, in the case of read heads of magnetoresistive type, the alternating read signal is asymmetrical and only approximately sinusoidal: the amplitude of the conventionally positive peaks available as positive voltages measured between the terminal OUT−, assumed as reference, and the terminal OUT+ is, in absolute value, greater than the amplitude of the negative peaks, available as negative voltages between the terminal OUT− and the terminal OUT+ and obviously available as a positive voltage between the terminal OUT+ taken as reference, and the terminal OUT−.

The input terminals IN+, IN− are respectively connected to the output terminals OUT+ and OUT−. The signal present between the input terminals IN+, IN− is applied to the input of the differential comparator 6 with hysteresis as well as to the peak detector 5. The term differential comparator with hysteresis is intended to mean a differential comparator which asserts a signal CP on a first output when the voltage supplied to the inputs exceeds a first predetermined value and which asserts a signal CN on a second output when the voltage applied to the inputs is less than a second predetermined value, possibly also negative.

A differential comparator with hysteresis can be constructed by a pair of differential comparators to which the same signal is supplied at input: the first comparator to assert an output signal (CP) when the input signal exceeds a first predetermined value and the second comparator to assert an output signal (CN) when the input signal is less than a predetermined value.

The asserted signal (CP) at the output from comparator 6 defines a first time window during which the signal applied to the input of the comparator exceeds a first predetermined value, and in which there is therefore contained a positive signal peak, and the asserted signal CN defines a second time window, separate from the first, and with no temporal superimposition therewith, during which the signal applied to the input of the comparator is less than a second predetermined value, in turn lower than the first, and in which there is therefore contained a negative signal peak.

Peak detector 5 is constituted, in a known way, by a differential amplifier 11, a capacitor 12 and a capacitor discharge circuit comprising a discharge current limiter resistor 13 in series with a switch 14. Output 15 from amplifier 11 is connected to one terminal of capacitor 12. The other terminal of capacitor 12 is connected to a ground reference. Advantageously, differential amplifier 11 includes an output stage with a transistor 41 in open emitter configuration, the emitter of which is directly connected to capacitor 12. The collector of transistor 41 receives its power supply (possibly through a current limiting resistor) from the supply voltage +V. In this way, the base-emitter junction of the output stage itself performs the function of the blocking diode normally provided in conventional peak detectors, which prevents discharge of the peak sampling capacitor 12 when the voltage of the input signal decreases from the peak value.

Output 15 of differential amplifier 11 is also connected, through switch 8, to one terminal of capacitor 9. The other terminal of capacitor 9 is connected to the ground reference. The closure of switch 8 connects capacitor 9 in parallel with capacitor 12 between output 15 of amplifier 11 and the common ground. Electronic switches 8 and 14, which are normally open, are closed respectively by the assertion of two commands AVE and DISC generated by control logic 7. Switches 8 and 14, as well as control logic 7, are preferably constituted by MOS transistors made with CMOS technology.

Control logic 7 is essentially a state machine activated by an asserted SAMPLE signal, generated externally to the servo-demodulator by a control unit, which, when asserted, indicates the transit of the "servo bursts" under read head 1. Control logic 7, if enabled by assertion of the SAMPLE signal, evolves as a function of the signals CP and CN applied to its input, generating the reset pulses DISC while the signal CP is asserted and asserting the signal AVE a first time with a first assertion of the signal CP and subsequently with the assertions of the signal CN after two preceding assertions of the signal CP.

Figure 4:
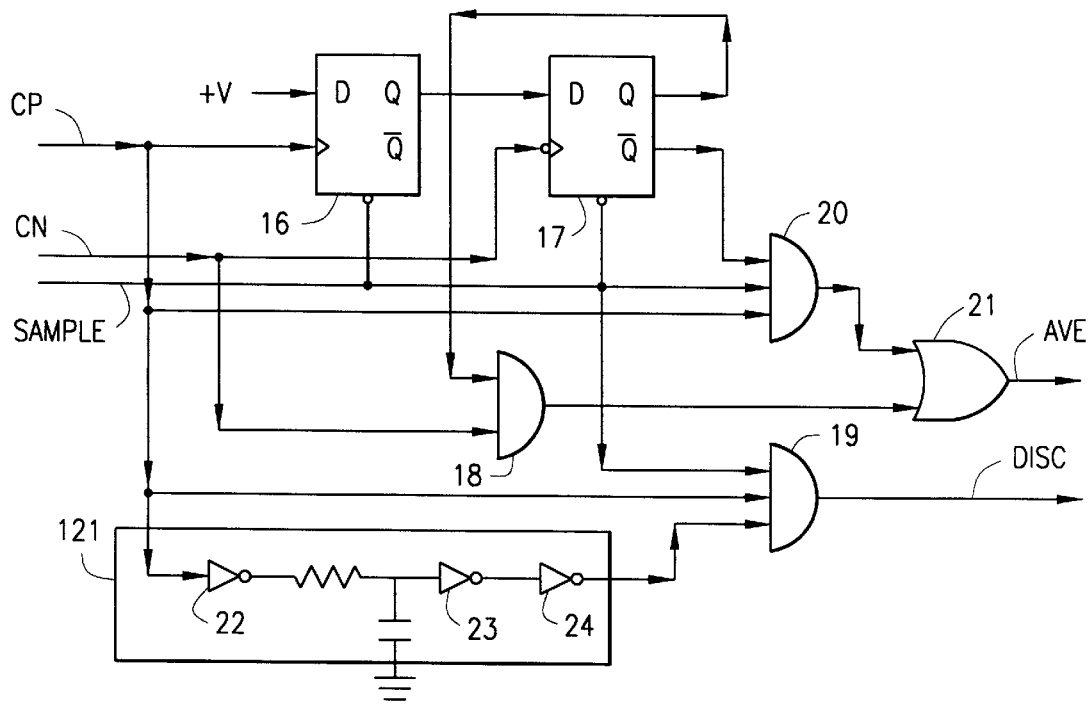
FIG. 4 is a circuit diagram of a preferred embodiment of logic control for the servo-demodulator of FIG. 3.

Referring now to FIG. 4, a preferred embodiment of control logic 7 is represented. Those skilled in the art will recognize that the embodiment can be widely varied. Control logic 7 comprises a first D-type flip-flop 16 activated by a positive edge applied to the clock input, a second flip-flop 17 of the same type but activated by a negative edge applied to the clock input, logic AND gates 18, 19, 20, a logic OR gate 21 and an inverting delay element 121.

Flip-flops 16 and 17 are put in their reset state by the deasserted SAMPLE signal applied to the reset input and receive the signals CP and CN respectively at their clock inputs. Flip-flop 16 has its D input connected to the positive voltage source +V representative of logic level 1. The D input of flip-flop 17 is connected to the Q output of flip-flop 16, its own Q output being connected to one input of AND gate 18 and its inverting output $\overline{Q}$ being connected to one input of AND gate 20. AND gate 18 also receives the signal CN at one input. AND gate 20 also receives the SAMPLE and CP signal at one input.

The outputs of AND gates 18 and 20 are connected to the inputs of OR gate 21 at the output of which the signal AVE is available. AND gate 19 receives at its input the signals SAMPLE, CP and the output signal from the inverting delay element 121. The signal DISC is available at the output of AND gate 19. The inverting delay element 121 can be constituted by an odd number of inverters, such as inverters 22, 23, 24, connected in cascade to increase the delay time, or even, as shown in the drawing, by an odd number of inverters, connected in cascade, with an interposed RC network to introduce a further delay.

Figure 5:
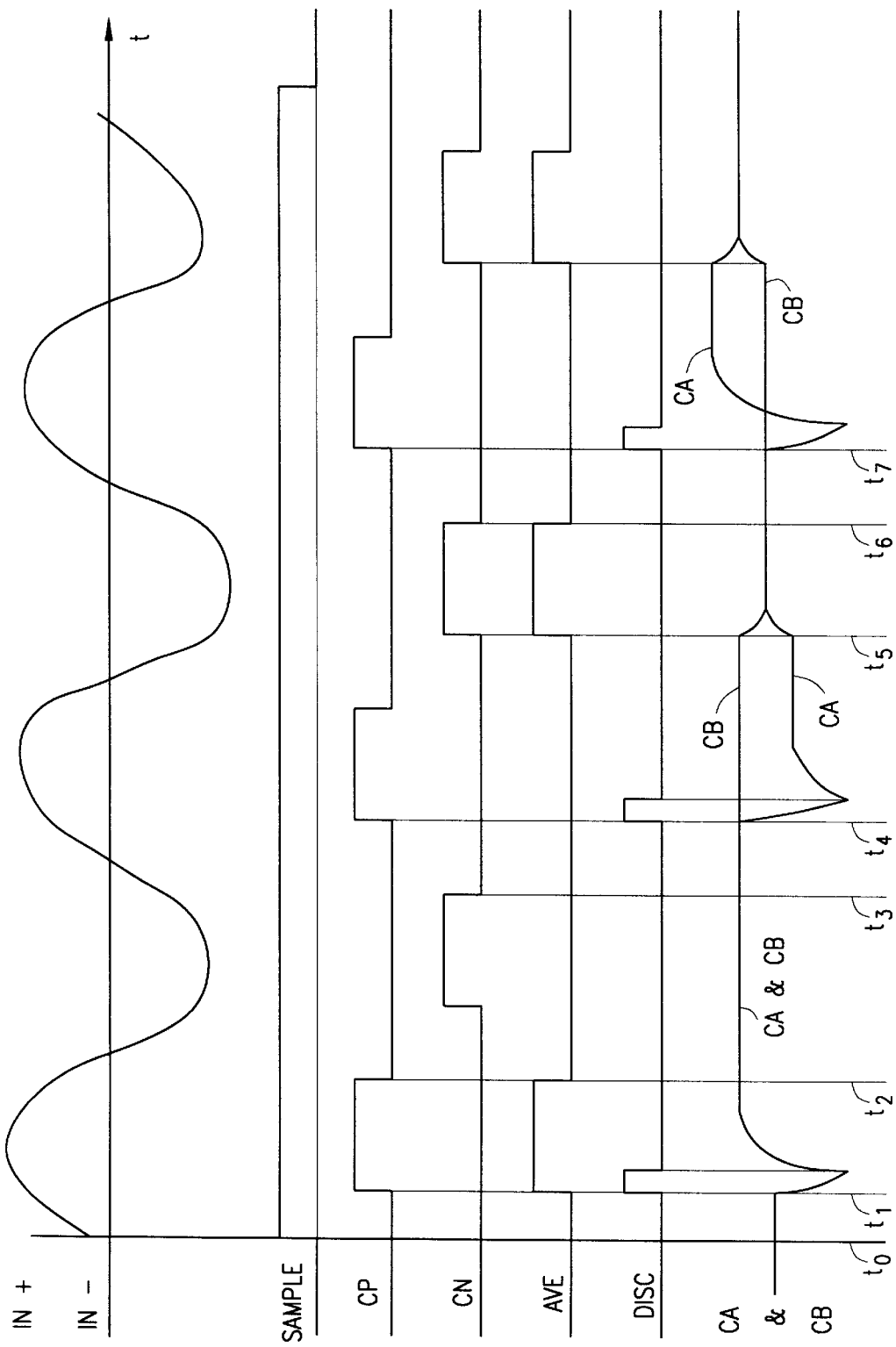
FIG. 5 is a timing diagram showing the functioning of the servo-demodulator of FIG. 3 and represents the level of the signal present at different circuit points.

Referring now to FIG. 5, a timing diagram illustrating the operation of the demodulator of FIG. 3 and its control logic 7, shown in FIG. 4, is shown. Waveform IN+, IN– represents the input voltage applied to the demodulator consequent to reading a servo burst. Waveform SAMPLE represents the logic level of the SAMPLE signal, which can be asserted at any time upon recognition of a "servo burst" field and which is deasserted at the end of the reading of the servo burst field, Waveforms CP, CN, AVE, DISC respectively represent the logic level of the signals CP, CN, AVE, DISC. Finally, waveforms CA, CB represent the charge voltage on capacitors 12 and 9 respectively.

At time t0, in a manner which can be entirely asynchronous with respect to the waveform of the input signal IN+, IN–, the signal SAMPLE is asserted, and at time t1, with the first rising edge of the signal CP, flip-flop 16 is set. Starting at the same time, since flip-flop 17 is still in reset, the signal AVE is asserted, which closes the switch 8. Starting at the same time, a short pulse DISC is also generated which controls the closure of switch 14 and causes at least partial discharge of capacitors 12 and 9. At the end of pulse DISC, both capacitors 12 and 9 charge to a voltage level substantially corresponding to the peak value of the positive half-wave applied to the input of the demodulator (multiplied by the gain of differential amplifier 11, which may be equal to 1). At time t2, with the deassertion of the signal CP, the signal AVE is deasserted, and switch 8 is opened. Capacitors 9 and 12, however, maintain the previously assumed charged state.

The subsequent assertion of the signal CN, which defines a time window in which a negative peak of the input signal to the decoder is contained, does not affect the state of control logic 7, but at time t3, when the voltage of the input signal at the decoder exceeds the predetermined lower threshold value of differential comparator 6, the signal CN is again deasserted and causes flip-flop 17 to set, AND gate 20 to be disabled, and AND gate 18 to be enabled. At time t4, when the voltage of the input signal to the decoder exceeds the predetermined upper threshold value of differential comparator 6, the signal CP is again asserted and defines the beginning of a new time window which contains a positive peak of the input signal. At time t4, a new DISC pulse is generated, which closes switch 14 and causes at least partial discharge of capacitor 12. Capacitor 9, on the other hand, retains the previously imposed charge state. At the end of the pulse DISC, capacitor 12 charges again to a voltage level corresponding to the voltage of the second positive peak of the input signal, and maintains this level until time t5.

At time t5, with a new assertion of the signal CN due to the decrease of the voltage of the input signal beyond the lower threshold of differential comparator 6, the signal AVE is also asserted for the whole of the time that CN is asserted. The assertion of AVE causes closure of switch 8 and obliges capacitors 12 and 9 to assume an equal charge voltage. Clearly, if V1A is the initial charge voltage of capacitor 12, V1B is the initial voltage of the charge of capacitor 9, and CA, CB are respectively the capacitance of capacitors 12 and 9, the capacitors assume a charge voltage:

V2A=V2B=(CA.V1A+CB.V1B)/(CA+CB)

which represents a weighted average of the two initial charge voltages. In particular, if CA=CB, the voltage V2A=V2B=(V1A+V1B)/2 represents the arithmetic mean of the two voltages. For this reason the signal AVE can be defined as an averaging operation activation signal or mean control signal.

At time t6, with deassertion of CN, switch 8 is opened, and with the assertion of CP at a subsequent time t7, capacitor 12 is discharged and then charged to the voltage corresponding to the voltage of a third voltage peak. The subsequent closure of switch 8 causes the two capacitors to assume a charge voltage which is the weighted average (as a function of CA and CB) of the last detected voltage peak and the weighted average of the voltage of the two preceding peaks. The process repeats indefinitely until the signal SAMPLE is deasserted. At this point, the voltage to which capacitor 9 is charged represents a weighted average of the amplitude of a plurality of positive peaks obtained with successive averaging operations.

If x is the number of peaks on which the averaging operation is performed and $va_n$ with n=1 . . . x the detected amplitude of the various peaks, $vb_n$ the charge voltage accumulated in capacitor 9 after n charging operations, the resultant weighted average is given by $$Vb_x = \sum_{2n}^{x} (VB_{(n-1)} \cdot CB + Va_n \cdot CA)/(CA + CB)$$

With a demodulator or decoder of the type described in FIG. 3, if n>2, it is not possible to attribute different peak measurements the same weight. In particular, if CA=CB, the last peak measurement has a weight equal to the cumulative weight of all the preceding measurements. Notwithstanding this, it is evident that the possible imprecision in measurement of one of the peaks due to disturbances, even if it is the last peak, influences the cumulative measurement with a lower weight than that which it would have done with a single measurement. In other words, immunity to noise is significantly improved.

With a convenient choice of the ratio between CB and CA greater than 1, for example, equal to 2, 3 or more, and in relation to the number of peaks which contribute to the weighted averaging operation, it is possible to equalize to a large extent the weight of the various peaks in the averaging operation. Once the weighted averaging process has been completed, the charge voltage of capacitor 9 relating to the positive peaks of one of the servo burst signals, can be converted by an A/D convertor 25 with input buffer, stored, and compared with the charge voltage of capacitor 9 resulting from the subsequent execution of a weighted averaging process on the positive peaks of the other of the two servo burst signals, the difference between the two weighted averages being indicative of the offset of the head from the track center.

These operations can be performed in a conventional manner without time limitations imposed by the frequency of the servo burst signals, which would make the analog-to-digital conversion of the amplitude of the different sample peaks, their memorization and subsequent arithmetic averaging in real time, excessively complex and onerous. The demodulator of FIG. 3 performs a weighted average of only positive peaks.

Figure 6:
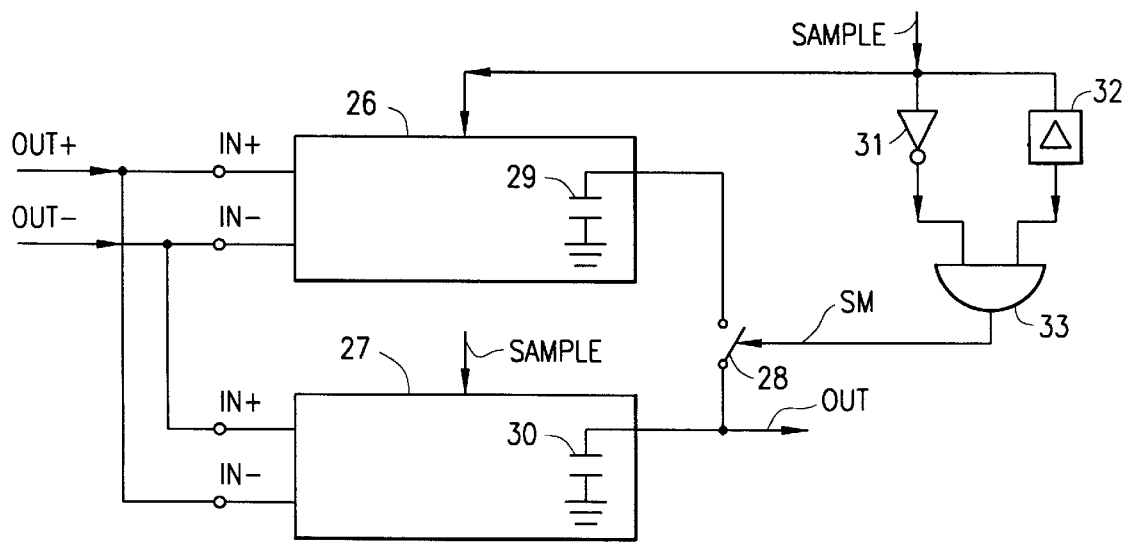
FIG. 6 is a block diagram of a preferred servo-demodulator in accordance with the present invention, for use in particular with read heads of magnetoresistive type and for the demodulation of asymmetrical signals.

A further increase in the precision, which is particularly advantageous if the signal read from the "servo bursts" is asymmetric (as occurs in the case of magnetostrictive read heads), can be achieved as shown in FIG. 6 with a duplication of the demodulator, one of the demodulators being dedicated to the measurement and weighted averaging of the amplitude of positive peaks, the other decoder being dedicated to the measurement and weighted averaging of the amplitude of negative peaks.

In FIG. 6, a first decoder 26, identical to that illustrated in FIG. 3, has its inputs IN+, IN− connected respectively to the outputs OUT+, OUT− of a read head. A second decoder 27, again identical to that illustrated in FIG. 3, has its inputs IN+, IN− connected respectively to the outputs OUT− and OUT+ of the read head, that is with an inversion of the input signal.

It is therefore evident that the identification of the positive and negative peaks being conventional and subordinated to whichever of the terminals, OUT+, OUT− is assumed as reference, that the peaks, seen as negative by decoder 26, are seen and treated by decoder 27 as positive peaks while the peaks seen as positive by decoder 26 are seen and treated by decoder 27 as negative peaks.

To perform the averaging, which can be arithmetic, of the weighted averages of the positive and negative peaks respectively, it is sufficient to provide an electronic switch 28 which connects in parallel output capacitors 29, 30 of the two decoders 26, 27 corresponding to capacitor 9 of FIG. 3.

The switch can be controlled, at the end of the process of forming the weighted average, by a pulse SM obtained, for example, from the SAMPLE signal, when this is deasserted, with a simple logic comprising an inverting element 31, a delay element 32 and an AND gate 33, the SAMPLE signal being input to the inputs of elements 31, 32 and the outputs of elements 31, 32 being connected to the inputs of AND gate 33 at the output of which the signal SM is available for control of switch 28.

Figure 7:
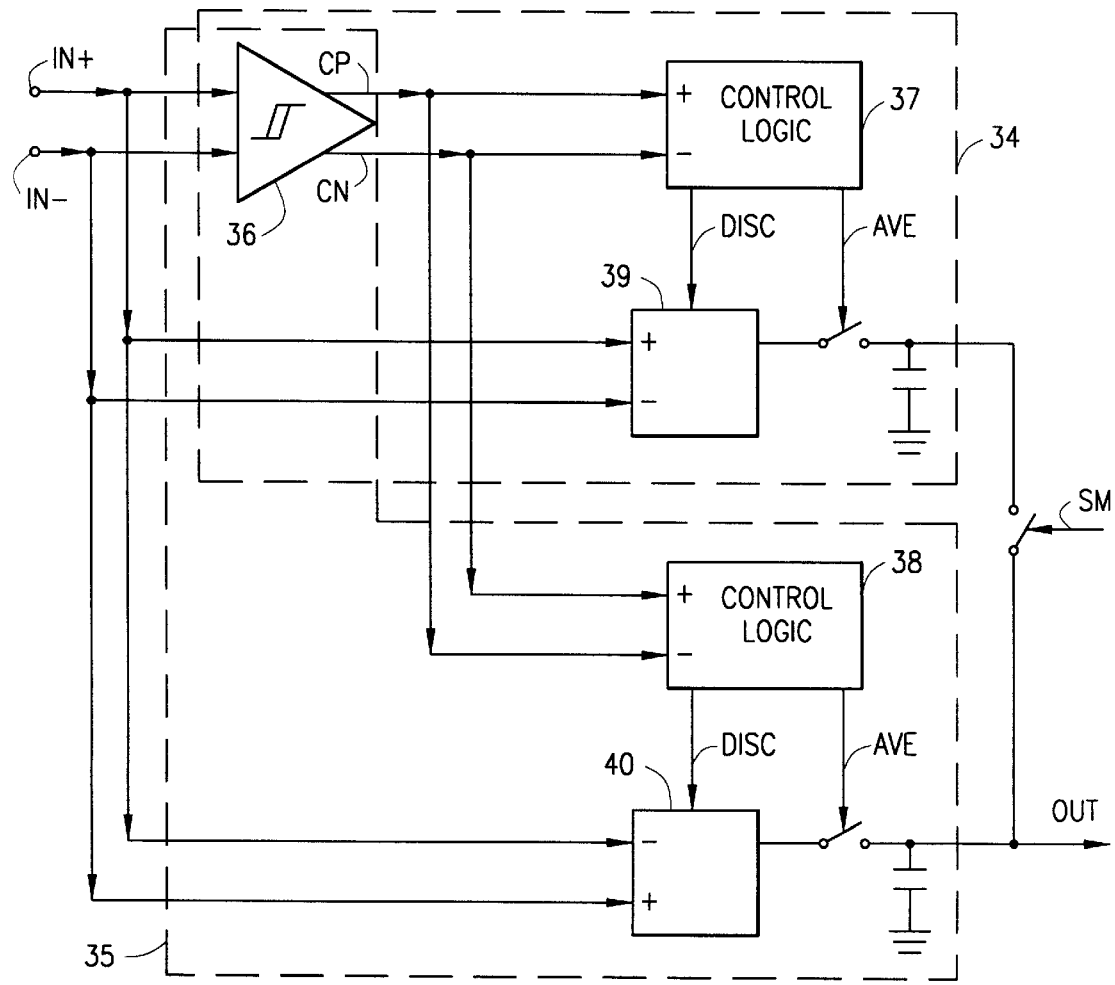
FIG. 7 is an alternate embodiment of the servo-demodulator of FIG. 6.

As shown in FIG. 7, this embodiment can be simplified by forming two decoders 34, 35 in such a way that differential comparator 36 with hysteresis is common to both the decoders. The signals CP and CN at the output from the differential comparator are applied to the inputs of control logic 37 of the first decoder, exactly as in the case of FIG. 3, and to the inputs of control logic 38 of the second decoder with signal reversal.

In the same way, the + and − inputs of peak detector 39 of first decoder 34 are connected to the IN+, IN− inputs, respectively, of the decoder, while the + and − inputs of peak detector 40 of second decoder 35 are connected respectively to the IN− and IN+ inputs with signal reversal. It is therefore evident that the signal CN applied to control logic 38 is seen as a signal which defines a time window containing a positive peak, while correspondingly, a peak contained in this time window is seen and sampled by peak detector 40 as a positive peak.

The preceding description relates only to a preferred embodiment, and it is clear that many variants can be introduced.

For example, differential comparator 6 with hysteresis, in particular in the case when it is necessary to recognize peaks of a single type (positive or negative), can be a simple differential comparator with a single output, for the generation of only one of the signals CP and CN, the other signal being obtained from the first with a simple inversion, or with logic which ensures a time separation between the assertion intervals of the two signals.

Control logic 7, in relation to the possibility of using logic components in which an electrical state can be representative of a logic state, or its inverse, also lends itself to a multiple variety of modifications.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A servo-demodulator for indicating the position of a read head relative to a magnetic record track of a magnetic disk, comprising:

a first servo-demodulator for receiving in succession a pair of variable signals, each variable signal corresponding to a position signal recorded on the magnetic disk and having alternating positive and negative peaks, and generating a first signal representing a weighted average of amplitudes of the positive peaks for each of the variable signals;

a second servo-demodulator for receiving in succession the pair of variable signals and generating a second signal representing a weighted average of amplitudes of the negative peaks for each of the variable signals;

a normally open switch for selectively averaging, for each variable signal, the first and second signals of the variable signal when the switch is enabled, the average of the first and second signals indicating a lateral position of the read head relative to the magnetic record track; and a control circuit for selectively enabling the switch.

2. A servo-demodulator as in claim 1, wherein said first and second demodulators together comprise:

a circuit for generating a first peak signal, the assertion of which defines a periodic time window for sampling each of said positive peaks of each variable signal, and a second peak signal, the assertion of which defines a second periodic time window for sampling each of said negative peaks of each variable signal;

wherein the first and second servo-demodulators each comprise control logic for receiving the first and second peak signals and a sample signal and generating one or more control signals therefrom, and a switched capacitive circuit for sampling and holding a value corresponding to the value of a peak of a variable signal based upon the one or more control signals.

3. The servo-demodulator of claim 2, wherein:

the normally open switch electrically connects together an output of the switched capacitive circuits of each of the first and second servo-demodulators when closed.

4. The servo-demodulator of claim 2, wherein:

the circuit comprises a comparator with hysteresis.

5. The servo-demodulator of claim 2, wherein:

the switched capacitive circuit of each of the first and second servo-demodulators include a peak detector circuit.

6. The servo-demodulator of claim 2, wherein:

the switched capacitive circuit of each of the first and second servo-demodulators includes a first capacitor for collecting a charge corresponding to at least one peak of the variable signals and a second capacitor selectively coupled to the capacitor of the corresponding peak detector circuit; and the control logic of each of the first and second servo-demodulators generates a reset control signal for selectively discharging the first capacitor of the corresponding peak detector circuit and an averaging control signal for selectively connecting the second capacitor to the first capacitor.

7. The servo-demodulator of claim 6, wherein:

the reset control signal generated by the control logic of the first servo-demodulator is asserted to correspond to each positive peak of each variable signal; and the reset control signal generated by the control logic of the second servo-demodulator is asserted to correspond to each negative peak of each variable signal.

8. The servo-demodulator of claim 6, wherein:

the averaging control signal generated by the control logic of the first servo-demodulator is asserted to correspond to a first positive peak and negative peaks following the first negative peak of each variable signal; and the averaging control signal generated by the control logic of the second servo-demodulator is asserted to correspond to a first negative peak and positive peaks following the first positive peak of each variable signal.

9. The servo-demodulator of claim 1, wherein:

the variable signals comprise burst signals corresponding to a sector on the magnetic disc.

10. A method for determining a position of a head relative to a magnetic record track on a magnetic disk for storing data, comprising the steps of:

receiving in succession a pair of variable signals, each variable signal corresponding to a position signal recorded on the magnetic disk and having alternating positive and negative peaks;

for each of the variable signals, generating a first signal representing a weighted average of the positive peaks of the variable signal;

for each of the variable signals, generating a second signal representing a weighted average of the negative peaks for the variable signal; and for each variable signal, averaging the first and second signals together to obtain an output signal representing a lateral position of the head relative to the magnetic record track on the magnetic disk.

11. The method of claim 10, wherein:

the step of generating a first signal comprises the steps of, for each variable signal, collecting a charge for each positive peak of the variable signal and combining the collected charges together; and the step of generating a second signal comprises the steps of, for each variable signal, collecting a charge for each negative peak of the variable signal and combining the collected charges together.

12. The method of claim 11, wherein the step of averaging comprises the step of:

for each variable signal, combining the collected charges for the positive peaks of the variable signal with the collected charges for the negative peaks of the variable signal to generate the output signal.

13. The method of claim 10, wherein:

the variable signals comprise burst signals corresponding to a sector on the magnetic disc.

14. An apparatus for determining a position of a head relative to a magnetic record track on a magnetic storage disk, comprising:

a first circuit for receiving in succession a pair of variable signals, each variable signal corresponding to a position signal recorded on the magnetic disk and having alternating positive and negative peaks;

a second circuit for generating, for each of the variable signals, a first signal representing a weighted average of the positive peaks of the variable signal;

a third circuit for generating, for each of the variable signals, a second signal representing a weighted average of the negative peaks for the variable signal; and a fourth circuit for averaging, for each of the variable signals, the first and second signals together to obtain an output signal representing a lateral position of the head relative to the magnetic record track on the magnetic disk.

15. The apparatus of claim 14, wherein:

the first and second circuits each comprises a servo-demodulator.

16. The apparatus of claim 14, wherein:

the second circuit includes a first capacitor, the first signal corresponds to an amount of charge appearing across the first capacitor;

the third circuit includes a second capacitor, the second signal corresponds to an amount of charge appearing across the second capacitor; and the fourth circuit comprises a circuit that selectively shorts the first capacitor to the second capacitor.

17. The apparatus of claim 14, wherein:

the first circuit comprises a comparator circuit for receiving an output of the first circuit and generating a first control signal defining each positive peak of each variable signal, and a second control signal defining each negative peak of each variable signal; and the second circuit comprises:

control logic for receiving the first and second control signals generated by the comparator circuit and generating a reset control signal, the assertion of the reset control signal occurring at a beginning of a positive peak of each variable signal, and an averaging control signal; and a switched capacitive circuit having a first capacitor that is discharged upon the assertion of the reset control signal and charged upon the de-assertion thereof, and a second capacitor that is shorted to the first capacitor upon the assertion of the averaging control signal, the output signal corresponding to the charge across the second capacitor.

18. The apparatus of claim 14, wherein:

the variable signals comprise burst signals corresponding to a sector on the magnetic disc.

* * * * *

UNITED STATES PATENT AND TRADEMARK OFFICE
CERTIFICATE OF CORRECTION

PATENT NO. : 6,204,990 B1
DATED : March 20, 2001
INVENTOR(S) : Melchiorre Bruccoleri et al.

Page 1 of 1

It is certified that error appears in the above-identified patent and that said Letters Patent is hereby corrected as shown below:

Title page,
Item [73], replace "SGS-Thompson Microelectronics" with -- SGS-Thomson Microelectronics --

Column 3,
Line 29, replace "signal" with -- signals --

Column 5,
Line 50, replace "pulses" with -- pulse --

Column 9,
Line 66, replace "include" with -- includes --

Signed and Sealed this

Fifth Day of March, 2002

Attest:

JAMES E. ROGAN
Attesting Officer
Director of the United States Patent and Trademark Office